US008726502B2

(12) United States Patent
Clark et al.

(10) Patent No.: US 8,726,502 B2
(45) Date of Patent: May 20, 2014

(54) TURBINE SERVICING APPARATUS AND METHODS

(75) Inventors: Jason Matthew Clark, Loveland, OH (US); Randall Stephen Corn, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 13/368,776

(22) Filed: Feb. 8, 2012

(65) Prior Publication Data

US 2013/0199008 A1 Aug. 8, 2013

(51) Int. Cl.
*B23P 6/00* (2006.01)

(52) U.S. Cl.
USPC ..................... 29/889.1; 29/402.01; 29/402.19

(58) Field of Classification Search
USPC .................... 29/889.1, 402.01, 402.19; 451/6
See application file for complete search history.

(56) References Cited

U.S. PATENT DOCUMENTS 5,102,221 A 4/1992 Desgranges et al.
5,155,941 A 10/1992 Takahashi et al.
5,475,485 A 12/1995 Diener
5,511,308 A * 4/1996 Ng et al. ...................... 29/889.1
5,644,394 A 7/1997 Owens
5,803,680 A 9/1998 Diener
6,316,065 B1 11/2001 Wallmann
6,542,230 B1 4/2003 Luke
6,899,593 B1 * 5/2005 Moeller et al. .................... 451/6
7,032,279 B2 4/2006 McCarvill et al.
7,097,539 B2 8/2006 Moeller et al.
7,112,118 B1 9/2006 Moeller et al.
7,285,038 B1 10/2007 Jioia
7,735,222 B2 6/2010 Sherlock et al.
7,766,726 B2 8/2010 Sherlock et al.
8,381,379 B2 * 2/2013 Holmes et al. .................. 29/254
2003/0221315 A1 12/2003 Baumann et al.
2004/0074093 A1 4/2004 McCarvill et al.
2004/0193016 A1 9/2004 Root et al.
2005/0107001 A1 5/2005 Moeller et al.
2006/0042083 A1 3/2006 Baker et al.
2006/0168809 A1 8/2006 McCarvill et al.
2008/0115648 A1 5/2008 Sherlock et al.
2009/0057972 A1 3/2009 Clark
2009/0282678 A1 11/2009 Williams et al.
2010/0266356 A1 10/2010 Holmes et al.
2012/0317771 A1 * 12/2012 Zhang et al. ............... 29/402.01

OTHER PUBLICATIONS

U.S. Appl. No. 13/161,579, filed Jun. 16, 2011.

* cited by examiner

*Primary Examiner* — David Bryant
*Assistant Examiner* — Jun Yoo
(74) *Attorney, Agent, or Firm* — Hoffman Warnick LLC; Ernest G. Cusick

(57) ABSTRACT

Apparatuses and methods for servicing a turbine are disclosed. Various embodiments of the invention include an apparatus adapted to service a turbine, where that apparatus includes: a base member fixedly mountable on an inlet of the turbine; an adjustment system mounted on the base member; a machining device operably connected to a first end of the adjustment system; and a control member operably connected to a second end of the adjustment system, the control member adapted to modify a position of the machining device to service a portion of the turbine inside the inlet of the turbine.

18 Claims, 4 Drawing Sheets

TURBINE SERVICING APPARATUS AND METHODS

FIELD OF THE INVENTION

The subject matter disclosed herein relates to turbines. More particularly, aspects of the disclosure relate to apparatuses and related methods for servicing a turbine.

BACKGROUND OF THE INVENTION

During operation of a turbine (e.g., a gas turbine compressor), components within that turbine (e.g., rotor and stator blades) can be subject to harsh operating conditions which may damage those components. In order to service turbine components such as these, the turbine is frequently disassembled. However, disassembly (and subsequent reassembly) can be both costly and time consuming. Attempts to service these turbine components without disassembly (or, in situ), can be limited by spatial constraints and machine capabilities.

BRIEF DESCRIPTION OF THE INVENTION

Apparatuses and methods for servicing a turbine are disclosed. Various embodiments of the invention include an apparatus adapted to service a turbine, where that apparatus includes: a base member fixedly mountable on an inlet of the turbine; an adjustment system mounted on the base member; a machining device operably connected to a first end of the adjustment system; and a control member operably connected to a second end of the adjustment system, the control member adapted to modify a position of the machining device to service a portion of the turbine inside the inlet of the turbine.

A first aspect of the invention includes an apparatus adapted to service a turbine having: a base member fixedly mountable on an inlet of the turbine; an adjustment system mounted on the base member; a machining device operably connected to a first end of the adjustment system; and a control member operably connected to a second end of the adjustment system, the control member adapted to modify a position of the machining device to service a portion of the turbine inside the inlet of the turbine.

A second aspect of the invention includes an apparatus having: a base member fixedly mountable on an inlet of a turbine; a hydraulic adjustment system mounted on the base member, the hydraulic adjustment system including at least one hydraulic pump and a hydraulic line operably connected with the at least one hydraulic pump; a machining device operably connected to the hydraulic line; and a control member operably connected to the at least one hydraulic pump, the control member adapted to actuate the at least one hydraulic pump to modify a position of the machining device for servicing a portion of the turbine inside the inlet of the turbine.

A third aspect of the invention includes a method for servicing a portion of a turbine, the method including: fixedly mounting an apparatus on an inlet of the turbine, the apparatus including: a base member adapted to fixedly mount on the inlet of the turbine; an adjustment system mounted on the base member; a machining device operably connected to a first end of the adjustment system; and a control member operably connected to a second end of the adjustment system; and actuating the control member from a location external to the inlet of the turbine to service the portion of the turbine internal to the inlet of the turbine.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Apparatuses and related methods for servicing a turbine are disclosed. The apparatuses and methods disclosed according to embodiments of the invention enable servicing of a portion of a turbine (e.g., a turbine compressor blade) from an area outside of the turbine. In various embodiments of the invention, apparatuses are disclosed which mount to an inlet or an inlet area of the turbine for servicing an internal portion of the turbine.

In contrast to conventional approaches to service a turbine in situ, various embodiments of the invention include an apparatus which is mountable on an inlet of a turbine, and is configured to service a portion of the turbine inside of the inlet. The apparatus can include a control mechanism located outside of the turbine inlet (when mounted), which allows for control of the apparatus from a position outside of the turbine inlet. In various embodiments, the control mechanism can include one or more hydraulic control devices (e.g., pumps/cylinders/lines) for actuating movement of a servicing (or, machining) device. Use of one or more hydraulic control devices allows for precise control of the machining device within the turbine. Precise control of the machining device can be particularly helpful when portions of the turbine are obstructed from view at the location outside of the turbine inlet.

Figure 1:
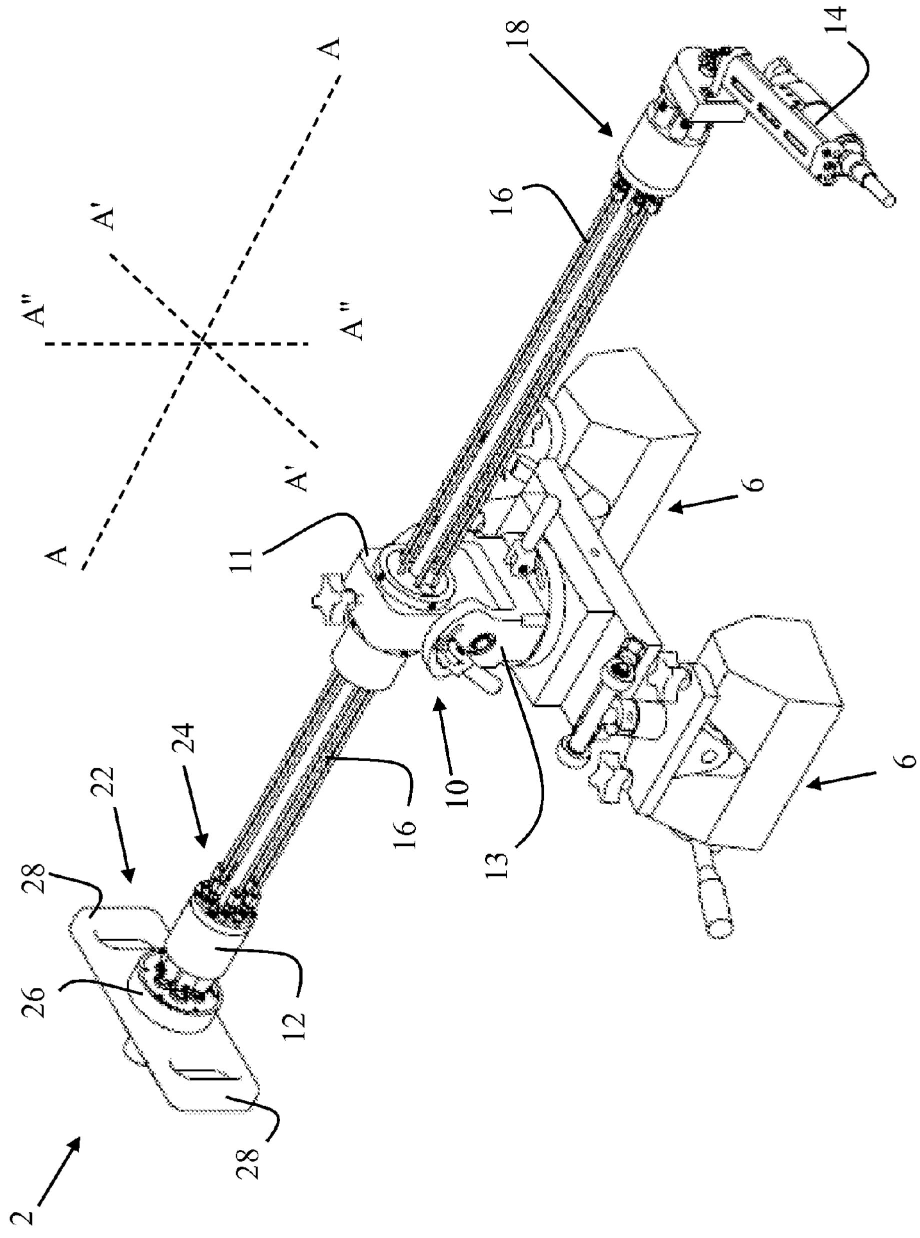
FIG. 1 shows a three-dimensional perspective view of an apparatus according to aspects of the invention.
Figure 2:
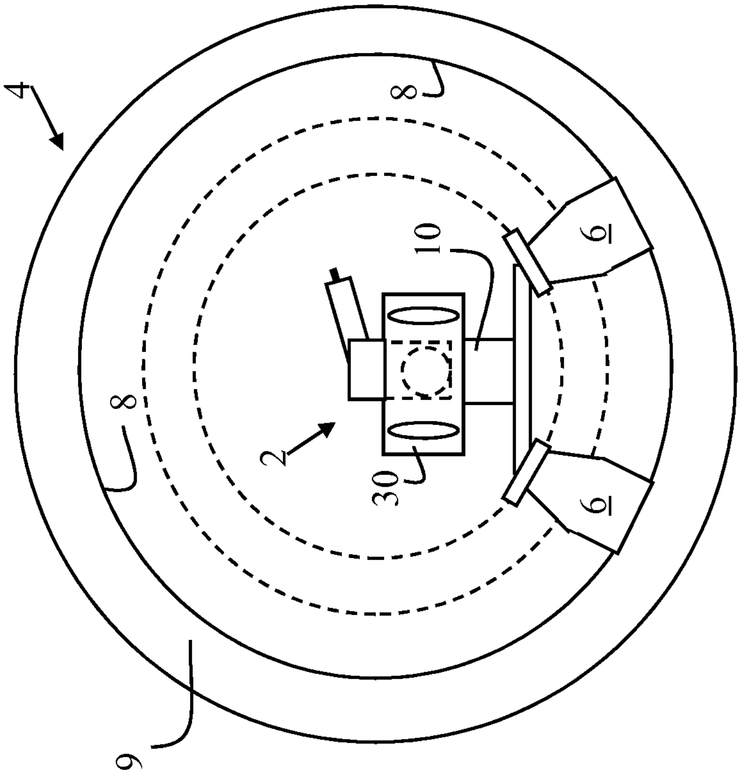
FIG. 2 shows a schematic end view of an apparatus along with a turbine according to aspects of the invention.

Turning to FIGS. 1 and 2, a three-dimensional perspective view of an apparatus 2, and an end view of the apparatus 2 and a turbine 4, are shown, respectively, according to various embodiments of the invention. In various embodiments of the invention, the apparatus 2 is configured for servicing a turbine (such as the turbine 4 shown in FIG. 2). The apparatus 2 can include a base member 6 (two shown) fixedly mountable on an inlet 8 of the turbine (FIG. 2), or proximate the inlet 8. In some cases, the turbine 4 can include a conventional gas turbine, and in particular cases, the turbine 4 can include a conventional gas turbine compressor. The inlet 8 can be an inlet bellmouth, which can be located at an axial end of the turbine's casing 9 (in the case of an axial flow turbine), or at a middle portion of the turbine casing (in the case of a double-flow turbine, not shown). As is known in the art, the inlet 8 and associated casing can be formed of a conventional metal. The apparatus 2 can further include an adjustment system 10 mounted on the base member 6. The adjustment system 10 can provide several degrees of freedom of motion relative to the base member 6. In some cases, the adjustment system 10 can include a tri-axis adjustment system which provides up to six degrees of freedom of motion relative to the base member 6. The tri-axis adjustment system is shown in the example of FIG. 1 can move along axes A-A, A'-A' and A"-A" to provide freedom of motion denoted.

The base member 6 shown in FIG. 1 is one example of a base member which can be implemented according to embodiments of the invention. In one particular embodiment, the base member 6 can include a magnetic member for magnetically affixing to the metallic turbine inlet bellmouth 8. In some cases, the base member 6 can include two distinct magnetic members for affixing to the turbine inlet bellmouth 8. In other cases, the base member 6 could include a single magnetic member for affixing to the turbine inlet bellmouth 8. In still other embodiments, the base member 6 can include more than two magnetic members for affixing to the turbine inlet bellmouth 8. In various other embodiments, the base member 6 can include a clamp for affixing to the inlet bellmouth 8, and in still other embodiments, the base member 6 could include a brace mechanism which could contact multiple points along an interior surface of the inlet bellmouth 8 to stabilize the apparatus 2. In those embodiments, the brace mechanism could include a swivel mount allowing for manipulation of the position of the apparatus within the inlet bellmouth 8. In any case, the base member 6 is fixedly mountable on the inlet (inlet bellmouth) 8 of the turbine 4, such that the base member 6 is substantially stable during operating of the apparatus 2 in servicing a desired portion of the turbine 4.

In various embodiments, the adjustment system 10 includes a hydraulic adjustment system with a multi-piston pump 12 for adjusting a position of a machining device (described further herein) 14. In some particular cases, the adjustment system 10 can include a six-piston pump providing for multiple (e.g., six) degrees of freedom of motion of the machining device 14 connected with the hydraulic adjustment system. In particular cases, the adjustment system 10 includes a hydraulic adjustment system which has a set of one or more hydraulic lines 16 spanning from the multi-piston pump 12 the machining device 14. The hydraulic lines 16 can be sized to span from an area external to the inlet (inlet bellmouth) 8 to a portion of the turbine 4 inside the inlet (inlet bellmouth) 8 when the base member 6 is mounted on the inlet 8. As shown, the adjustment system can include a guide 11 for allowing axial (along axis A-A) movement of the hydraulic lines 16, and a swivel mount 13 for allowing adjustment of the hydraulic lines 16 along the A-A' plane and the A-A" plane.

As noted herein, the apparatus 2 can further include the machining device 14 operably connected to a first end 18 of the adjustment system 10. The machining device 14 can include any conventional machining apparatus for servicing a turbine component, such as a turbine blade. In some cases, the machining device 14 can include one or more grinding apparatuses including grinding stones for servicing one or more components within the turbine. In other cases, the machining device 14 can include a conventional peening machine, a conventional saw or sanding machine, etc. As described herein, in particular embodiments of the invention, the machining device 14 is capable of reaching and machining a rotor blade and/or a stator blade (shown in FIG. 3) of the turbine 4. In some cases, where the class of turbine 4 has blades in stages ranging from R0 (initial) to RN (final), the machining device 14 can reach the R1 stage of blades, or those next to the initial (R0) stage. In the case of stator blades (S0, S1, etc.), the machining device 14 can reach an initial (S0) stage or any other stage (S1, S2, etc.) of the turbine 4. It is understood that the machining device 14 can be controlled via conduits or wires running along the body of the adjustment system 10 (parallel with the hydraulic lines 16). In some cases, the machining device 14 can be controlled wirelessly by a remote control system.

The apparatus 2 can further include a control member 22 operably connected to a second end 24 of the adjustment system 10. The control member 22 can be used for modifying a position of the machining device 14 to service a portion of the turbine 4 inside the inlet 8 of the turbine 4. The control member 22 can include a control device 26 for actuating one or more pistons in the multi-piston pump 12. In some cases, the control device 26 includes one or more electrical, mechanical, and/or electro-mechanical components for actuating one or more pistons in the multi-piston pump 12. In some cases, the control device 26 includes one or more handles 28 for allowing a user (e.g., a human user) to actuate movement of the adjustment system 10. The handles 28 can form or accompany a user interface 30 (FIG. 2) or other control mechanism for allowing the user to operate the apparatus 2 for servicing the turbine 4.

Figure 3:
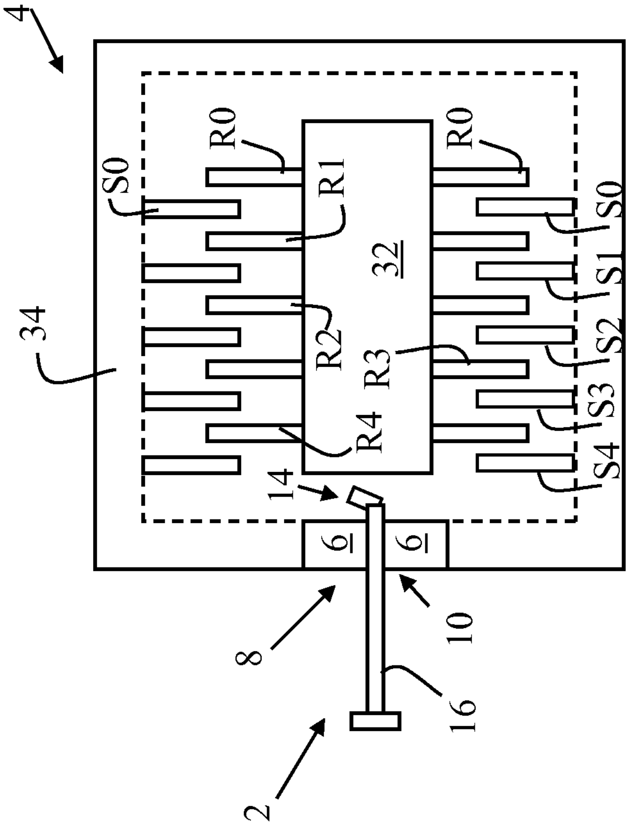
FIG. 3 shows a schematic cross-sectional top view of an apparatus along with a turbine according to aspects of the invention.

FIG. 3 shows a schematic cross-sectional top view of the apparatus 2 and a portion of the turbine 4 according to embodiments of the invention. As shown, the turbine 4 can include a rotor body 32 with sets of rotor blades e.g., R0-R4 extending radially therefrom. Interspersed between the plurality of rotor blades (R0-R4) are respective sets of stator blades, e.g., S0-S1, extending radially from a stator 34. The apparatus 2 is shown mounted on the inlet 8 of the turbine 4, and is configured to extend inside of the turbine 4 to reach up to the R1 set of rotor blades, and/or the S0 set of stator blades. As noted herein, during operation of the turbine 4, blades in any of the sets of rotor blades (e.g., R0-R4) or the sets of stator blades (e.g., S0-S4). The apparatus 2 can be configured to fixedly mount on or proximate to the bellmouth inlet 8 of the turbine 4 for servicing these blades and/or other portions of the turbine 4.

In contrast to conventional approaches, the apparatuses (e.g., apparatus 2 and alternatives) described according to embodiments of the invention can service portions of a turbine (e.g., rotor and/or stator blades up to the R1/S0 stage) in situ. The apparatuses can mount on or proximate to the inlet (e.g., bellmouth inlet), and extend within the turbine casing to machine portions of the turbine inside the casing. As noted herein, in particular embodiments, a hydraulic-based adjustment system allows for precise movement of a machining apparatus within the turbine casing to reach the desired component for machining.

Figure 4:
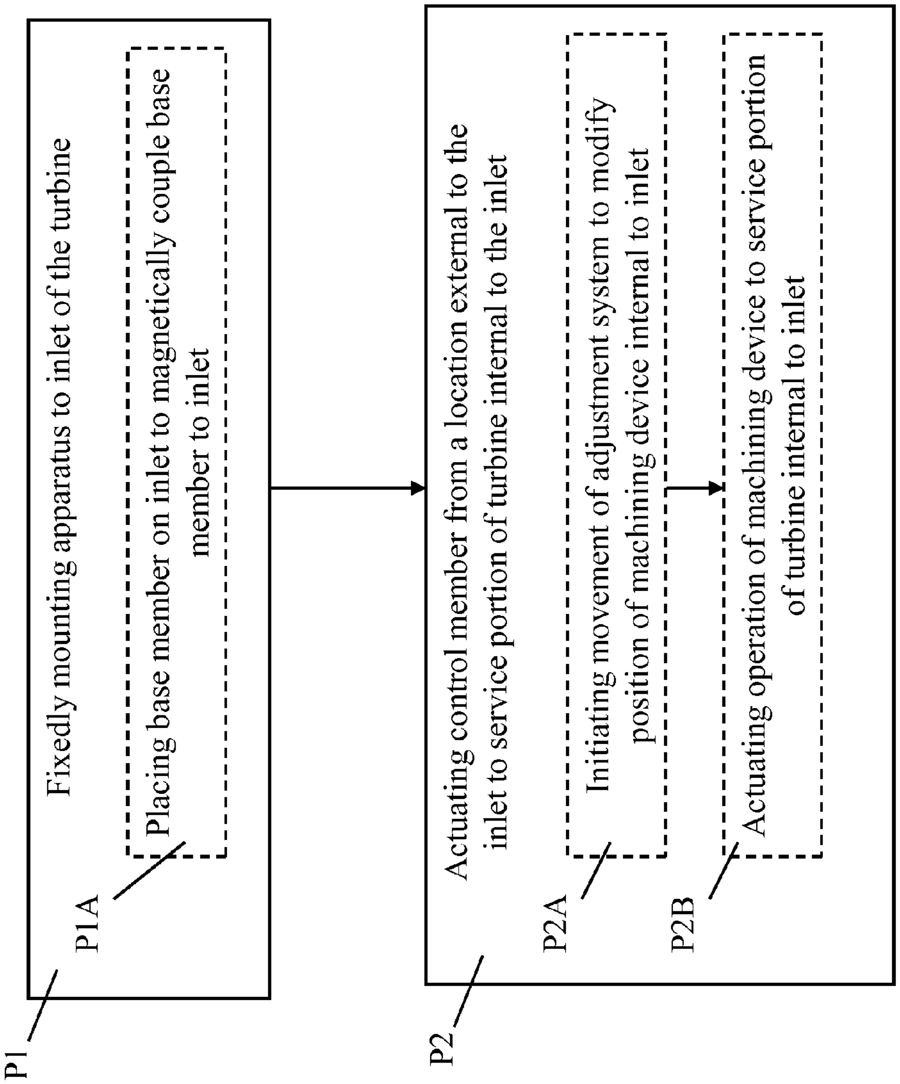
FIG. 4 shows a flow diagram illustrating a method according to various embodiments of the invention.

Various embodiments of the invention include methods of servicing a portion of a turbine (e.g., turbine 4). FIG. 4 includes a flow chart illustrating an example method of servicing a portion of a turbine 4, where the method can include:

Process P1: fixedly mounting an apparatus on an inlet of the turbine, the apparatus. In some cases, the apparatus can include: a base member adapted to fixedly mount on the inlet of the turbine; an adjustment system mounted on the base member; a machining device operably connected to a first end of the adjustment system; and a control member operably connected to a second end of the adjustment system. In various embodiments, process P1 can include sub-process P1A: placing the base member on the inlet to magnetically couple the base member to the inlet.

Following process P1, Process P2 can include: actuating the control member from a location external to the inlet of the turbine to service the portion of the turbine internal to the inlet of the turbine. Process P2 can include sub-processes:

Process P2A: initiating movement of the adjustment system to modify the position of the machining device internal to the inlet; and Process P2B: actuating operation of the machining device to service a portion of the turbine internal to the inlet.

In some particular cases, a process of using the apparatus 2 to service a portion of a turbine 4 can include mounting the apparatus 2 (and in particular, base member(s) 6) on the inlet 8 of the turbine 4. The process could further include utilizing the handles 28, the guide 11 and or the swivel mount 13 to adjust a position of the hydraulic lines 16 relative to the desired blade in the turbine 4. Additionally, the process could include actuating buttons or controls on the user interface 30 (e.g., via buttons or controls) to initiate movement of at least one piston in the multi-piston pump 12. The movement of the at least one piston in the multi-piston pump 12 causes the flow of hydraulic fluid through at least one of the hydraulic lines 16, which can in turn actuate movement of one or more pistons/actuatable devices proximate the end 18 of the adjustment system 10. Actuating the pistons proximate the end 18 of the adjustment system 10 allows a user (e.g., a human user) to manipulate the position of the machining device 14 within the turbine 4, while the user is in a position outside of the turbine 4.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An apparatus adapted to servicing a turbine, the apparatus comprising:
- a base member fixedly mountable on an inlet of the turbine;
- an adjustment system mounted on the base member, wherein the adjustment system includes a hydraulic adjustment system having:
  - a hydraulic pump;
  - a plurality of hydraulic lines operably connected with the hydraulic pump and a machining device,
  - wherein the hydraulic pump is designed to initiate movement of the machining device via the plurality of hydraulic lines;
  - a guide for allowing axial movement of the hydraulic lines along an axis (A-A) of the hydraulic lines; and
  - a swivel mount for allowing adjustment of the hydraulic lines along a first plane (A-A') coplanar with the axis (A-A) of the hydraulic lines and along a second plane (A-A") perpendicular to the first plane (A-A');
- the machining device operably connected to a first end of the adjustment system; and
- a control member operably connected to a second end of the adjustment system, the control member adapted to modify a position of the machining device to service a portion of the turbine inside the inlet of the turbine.

2. The apparatus of claim 1, wherein the portion of the turbine is one of a rotor blade or a stator blade.

3. The apparatus of claim 1, wherein the control member is controllable from a position external to the inlet of the turbine.

4. The apparatus of claim 1, wherein the control member is controllable by a human operator.

5. The apparatus of claim 1, wherein the adjustment system allows for a multi degree-of-motion adjustment of the position of the machining device.

6. The apparatus of claim 1, wherein the at least one hydraulic pump includes a 6-piston pump.

7. The apparatus of claim 1, wherein the swivel mount is located over the base member.

8. An apparatus comprising:
- a base member fixedly mountable on an inlet of a turbine;
- a hydraulic adjustment system mounted on the base member, the hydraulic adjustment system including:
  - at least one hydraulic pump and a hydraulic line operably connected with the at least one hydraulic pump,
  - wherein the at least one hydraulic pump is designed to initiate movement of a machining device via the hydraulic line;
  - a guide for allowing axial movement of the hydraulic line along an axis (A-A) of the hydraulic line; and
  - a swivel mount for allowing adjustment of the hydraulic line along a first plane (A-A') coplanar with the axis (A-A) of the hydraulic line and along a second plane (A-A") perpendicular to the first plane (A-A');
- the machining device operably connected to the hydraulic line; and
- a control member operably connected to the at least one hydraulic pump, the control member adapted to actuate the at least one hydraulic pump to modify a position of the machining device for servicing a portion of the turbine inside the inlet of the turbine.

9. The apparatus of claim 8, wherein the portion of the turbine is one of a rotor blade or a stator blade.

10. The apparatus of claim 8, wherein the control member is controllable from a position external to the inlet of the turbine.

11. The apparatus of claim 8, wherein the control member is controllable by a human operator.

12. The apparatus of claim 8, wherein the hydraulic adjustment system allows for a multi degree-of-motion adjustment of the position of the machining device.

13. The apparatus of claim 8, wherein the hydraulic adjustment system includes a 6-piston pump.

14. The apparatus of claim 8, wherein the swivel mount is located over the base member.

15. A method for servicing a portion of a turbine, the method comprising:
- fixedly mounting an apparatus on an inlet of the turbine, the apparatus including:
  - a base member adapted to fixedly mount on the inlet of the turbine;
  - an adjustment system mounted on the base member, wherein the adjustment system includes a hydraulic adjustment system having:

a hydraulic pump;

a plurality of hydraulic lines operably connected with the hydraulic pump and a machining device, wherein the hydraulic pump is designed to initiate movement of the machining device via the plurality of hydraulic lines;

a guide for allowing axial movement of the hydraulic lines along an axis (A-A) of the hydraulic lines; and a swivel mount for allowing adjustment of the hydraulic lines along a first plane (A-A') coplanar with the axis (A-A) of the hydraulic lines and along a second plane (A-A") perpendicular to the first plane (A-A');

the machining device operably connected to a first end of the adjustment system; and a control member operably connected to a second end of the adjustment system; and actuating the control member from a location external to the inlet of the turbine to service the portion of the turbine internal to the inlet of the turbine.

16. The method of claim 15, the actuating of the control member further comprising:

initiating movement of the adjustment system to modify a position of the machining device internal to the inlet of the turbine; and actuating operation of the machining device to service the portion of the turbine internal to the inlet of the turbine.

17. The method of claim 16, wherein the adjustment system allows for a multi degree-of-motion adjustment of the position of the machining device.

18. The method of claim 15, wherein the fixedly mounting includes placing the base member on the inlet of the turbine to magnetically couple the base member and the inlet of the turbine.

* * * * *